(12) United States Patent
Krzywon

(10) Patent No.: US 11,982,190 B2
(45) Date of Patent: May 14, 2024

(54) PROPELLER CONTROL UNIT

(71) Applicant: PRATT & WHITNEY CANADA CORP., Longueuil (CA)

(72) Inventor: Jagoda Krzywon, Longueuil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 504 days.

(21) Appl. No.: 17/165,108

(22) Filed: Feb. 2, 2021

(65) Prior Publication Data
US 2022/0243606 A1    Aug. 4, 2022

(51) Int. Cl.
| | | |
|---|---|---|
| *B64C 11/38* | (2006.01) | |
| *B64C 11/30* | (2006.01) | |
| *B64C 27/64* | (2006.01) | |
| *F01D 7/00* | (2006.01) | |
| *F01D 15/02* | (2006.01) | |
| *F01D 15/12* | (2006.01) | |

(52) U.S. Cl.
CPC ............ *F01D 15/02* (2013.01); *B64C 11/303* (2013.01); *B64C 11/38* (2013.01); *B64C 11/385* (2013.01); *B64C 27/64* (2013.01); *F01D 7/00* (2013.01); *F01D 15/12* (2013.01); *F05D 2270/64* (2013.01)

(58) Field of Classification Search
CPC ..... B64C 11/303; B64C 11/38; B64C 11/385; B64C 27/64; F05D 2270/64
See application file for complete search history.

(56) References Cited

U.S. PATENT DOCUMENTS

| | | | | |
|---|---|---|---|---|
| 3,004,608 | A * | 10/1961 | Pond ..................... | B64C 11/40 416/47 |
| 5,174,718 | A | 12/1992 | Lampeter et al. | |
| 6,059,528 | A * | 5/2000 | Danielson ............ | B64C 11/303 416/61 |
| 2005/0135929 | A1* | 6/2005 | Waddleton ............ | B64C 11/38 416/1 |
| 2013/0323050 | A1* | 12/2013 | Kleckler ............... | B64C 11/385 416/1 |

(Continued)

FOREIGN PATENT DOCUMENTS

| | | |
|---|---|---|
| EP | 3293109 | 3/2018 |
| EP | 3447315 | 2/2019 |

*Primary Examiner* — Courtney D Heinle
*Assistant Examiner* — Andrew J Marien
(74) *Attorney, Agent, or Firm* — NORTON ROSE FULBRIGHT CANADA LLP

(57) ABSTRACT

A propeller control unit (PCU) for controlling pitch angles of blades of a propeller, has: a pitch angle actuator; a servo valve hydraulically connected to the pitch angle actuator and to a first hydraulic fluid source; and a feather valve having a body movable within a cavity, the feather valve having a first actuation port and a second actuation port both in fluid communication with the cavity, the body between the first actuation port and the second actuation port, the body being movable to selectively hydraulically connect the pitch angle actuator to the servo valve through the feather valve or to hydraulically connect the pitch angle actuator to a drain line through the feather valve, the first actuation port and the second actuation port hydraulically connected to a second hydraulic fluid source independent from the first hydraulic fluid source.

20 Claims, 5 Drawing Sheets

(56) References Cited

U.S. PATENT DOCUMENTS

| | | |
|---|---|---|
| 2016/0207609 A1 | 7/2016 | Belmonte et al. |
| 2017/0066523 A1 | 3/2017 | Miszkiewicz |
| 2017/0361919 A1* | 12/2017 | Waddleton ............ F04D 29/582 |
| 2018/0043991 A1 | 2/2018 | Tajan et al. |
| 2019/0031319 A1* | 1/2019 | Calkins .................. B64C 11/40 |
| 2019/0092453 A1 | 3/2019 | Hoemke et al. |
| 2020/0039635 A1* | 2/2020 | Lachance ............. B64C 11/385 |
| 2020/0189721 A1* | 6/2020 | Maver ..................... B64C 11/40 |
| 2020/0198765 A1* | 6/2020 | Futa, Jr. .................. F02C 6/206 |

\* cited by examiner

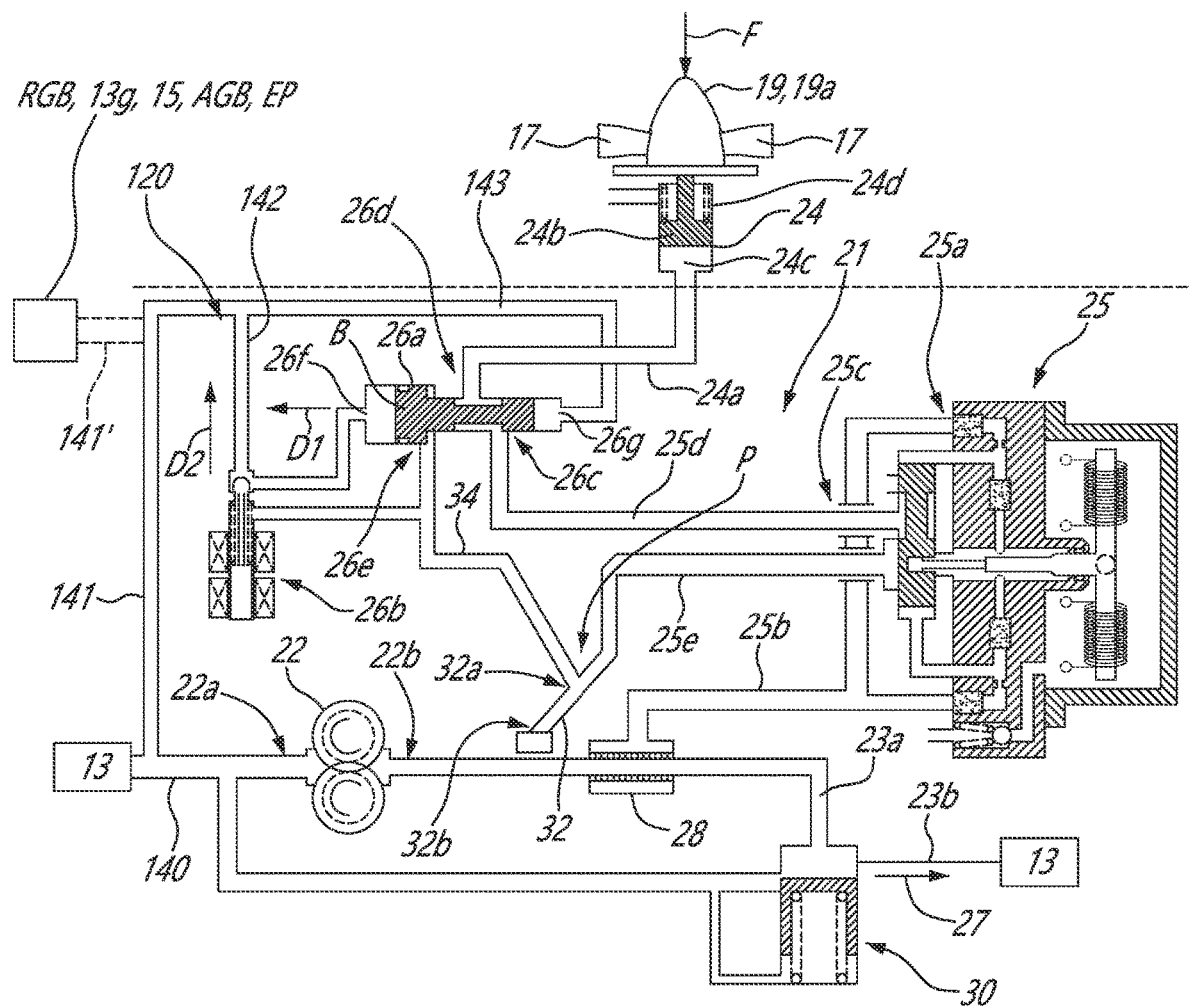

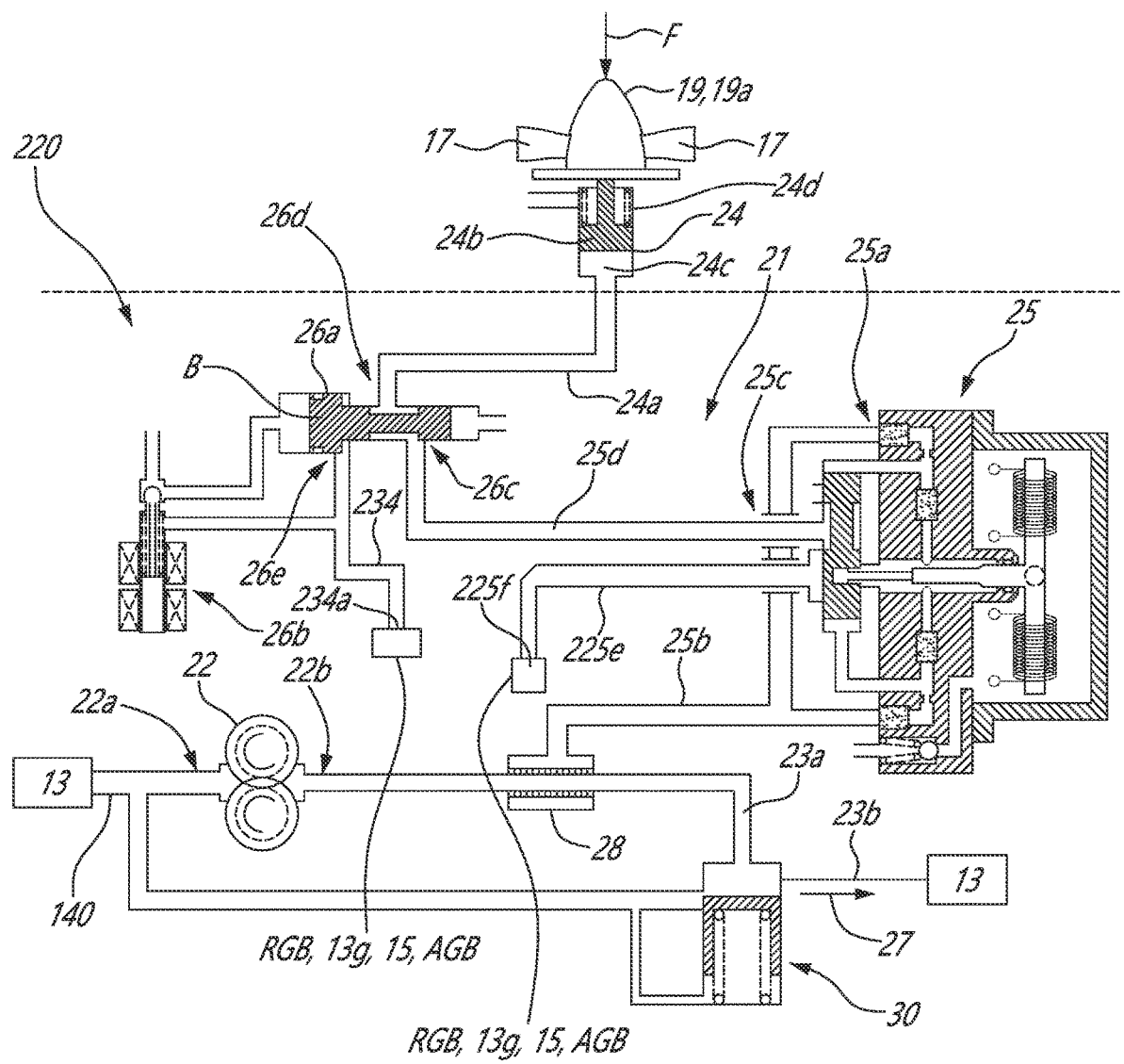

PROPELLER CONTROL UNIT

TECHNICAL FIELD

The application relates generally to turboprop gas turbine engines and, more particularly, to oil systems for such turboprop engines.

BACKGROUND OF THE ART

Turboprop gas turbine engines for aircraft which use propellers to provide propulsion have blade angle control systems to control pitch angles of blades of the propeller. The blade angle control system is actuated by hydraulic fluid which is supplied under pressure by a pump. In adverse conditions, for instance upon engine malfunction, it may be required to orient the blades in a feather position to minimize drag caused by the blades and to avoid wind milling of the propeller.

SUMMARY

In one aspect, there is provided a propeller control unit (PCU) for controlling pitch angles of blades of a propeller, comprising: a pitch angle actuator operatively connected to the blades of the propeller; a servo valve hydraulically connected to the pitch angle actuator and to a first hydraulic fluid source, the servo valve operable to flow hydraulic fluid to and from the pitch angle actuator to control the pitch angles of the blades; and a feather valve having a body movable within a cavity, the feather valve having a first actuation port and a second actuation port both in fluid communication with the cavity, the body between the first actuation port and the second actuation port, the body being movable to selectively hydraulically connect the pitch angle actuator to the servo valve through the feather valve for controlling the pitch angles or to hydraulically connect the pitch angle actuator to a drain line through the feather valve for feathering the blades, the first actuation port and the second actuation port hydraulically connected to a second hydraulic fluid source independent from the first hydraulic fluid source for providing hydraulic pressure on the body of the feather valve.

In some embodiments, the first hydraulic fluid source and the second hydraulic fluid source correspond to first and second connections point on a main line, the first and second connection points being spaced apart from one another.

In some embodiments, a pump is hydraulically connected on the main line for flowing the hydraulic fluid toward the servo valve, the first connection point located upstream of the pump, the second connection point located downstream of the pump.

In some embodiments, the first hydraulic fluid source and the second hydraulic fluid source are two different components.

In some embodiments, the first hydraulic fluid source is one of a reduction gearbox, an hydraulic fluid tank, an accessory gearbox, and an engine oil system, and wherein the second hydraulic fluid source is another one of the reduction gearbox, the hydraulic fluid tank, the accessory gearbox, and the engine oil system.

In some embodiments, the servo valve is hydraulically connected to the first hydraulic fluid source through a filtering element.

In some embodiments, the first hydraulic source and the second hydraulic source are two different connection ports on a common component.

In some embodiments, the common component is one of a reduction gearbox, an hydraulic fluid tank, an accessory gearbox, and an engine oil system, and wherein the second hydraulic fluid source is another one of the reduction gearbox, the hydraulic fluid tank, the accessory gearbox, and the engine oil system.

In another aspect, there is provided a propeller control unit (PCU) for controlling pitch angles of blades of a propeller, comprising: a pitch angle actuator operatively connected to the blades of the propeller; a servo valve hydraulically connected to the pitch angle actuator, the servo valve hydraulically connected to an hydraulic fluid source via a first line, the servo valve operable to flow hydraulic fluid to and from the pitch angle actuator to control the pitch angles of the blades; and a feather valve having a body movable within a cavity, the feather valve having a first actuation port and a second actuation port both in fluid communication with the cavity, the body between the first actuation port and the second actuation port, the body being movable to selectively hydraulically connect the pitch angle actuator to the servo valve through the feather valve for controlling the pitch angles or to hydraulically connect the pitch angle actuator to a drain line through the feather valve for feathering the blades, the first actuation port and the second actuation port hydraulically connected to the hydraulic fluid source via a second line independent from the first line.

In some embodiments, the first line is hydraulically connected to a main line at a first connection point, the second line hydraulically connected to the main line at a second connection point spaced apart from the first connection point, the main line hydraulically connected to the hydraulic fluid source.

In some embodiments, a pump is hydraulically connected on the main line, the first connection point located upstream of the pump, the second connection point located downstream of the pump.

In some embodiments, each of the first and second lines is hydraulically connected to a respective one of two distinct ports defined by one of a reduction gearbox, an hydraulic fluid tank, an accessory gearbox, and an engine oil system.

In some embodiments, the servo valve is hydraulically connected to the hydraulic fluid source via the first line and via a filtering element.

In yet another aspect, there is provided a propeller control unit (PCU) for controlling pitch angles of blades of a propeller, comprising: a pitch angle actuator operatively connected to the blades of the propeller; a servo valve hydraulically connected to the pitch angle actuator, the servo valve hydraulically connected to a hydraulic fluid source, the servo valve operable to flow hydraulic fluid to and from the pitch angle actuator to control the pitch angles of the blades, the servo valve having an outlet; a feather valve operable to selectively hydraulically connect the pitch angle actuator to the servo valve through the feather valve for controlling the pitch angles or to hydraulically connect the pitch angle actuator to a drain outlet of the feather valve for feathering the blades; and a first drain line hydraulically connected to the outlet of the servo valve, the first drain line having a first drain outlet; a second drain line hydraulically connected to the drain outlet of the feather valve, the second drain line having a second drain outlet, the first drain outlet and the second drain outlet being independent from one another.

In some embodiments, the first drain outlet is hydraulically connected to one of a reduction gearbox, an hydraulic fluid tank, an accessory gearbox, and an engine oil system, the second drain outlet hydraulically connected to another one of the reduction gearbox, the hydraulic fluid tank, the accessory gearbox, and the engine oil system.

In some embodiments, each of the first drain outlet and second drain outlet is hydraulically connected to a respective one of two distinct ports defined by one of a reduction gearbox, an hydraulic fluid tank, an accessory gearbox, and an engine oil system.

In some embodiments, the feather valve has a first actuation port, a second actuation port, and a body between the first actuation port and the second actuation port, the body being movable within a cavity of the feather valve to selectively hydraulically connect the pitch angle actuator to the servo valve through the feather valve or to the second drain line through the feather valve, the first actuation port and the second actuation port hydraulically connected to the hydraulic fluid source via a first line, the first line independent from a second line hydraulically connecting the servo valve to the hydraulic fluid source.

In some embodiments, the first line is hydraulically connected to a main line at a first connection point, the second line hydraulically connected to the main line at a second connection point spaced apart from the first connection point.

In some embodiments, a pump is hydraulically connected on the main line for flowing hydraulic fluid toward the servo valve, the first connection point located upstream of the pump, the second connection point located downstream of the pump.

In some embodiments, each of the first and second lines is hydraulically connected to a respective one of two distinct ports defined by one of a reduction gearbox, an hydraulic fluid tank, an accessory gearbox, and an engine oil system.

DESCRIPTION OF THE DRAWINGS

Reference is now made to the accompanying figures in which:

FIG. 4 is a schematic view of a propeller blade angle control circuit in accordance with a first exemplary alternative embodiment that may be used with the gas turbine engine of FIG. 1; and FIG. 5 is a schematic view of a propeller blade angle control circuit in accordance with a second exemplary alternative embodiment that may be used with the gas turbine engine of FIG. 1.

DETAILED DESCRIPTION

Figure 1:
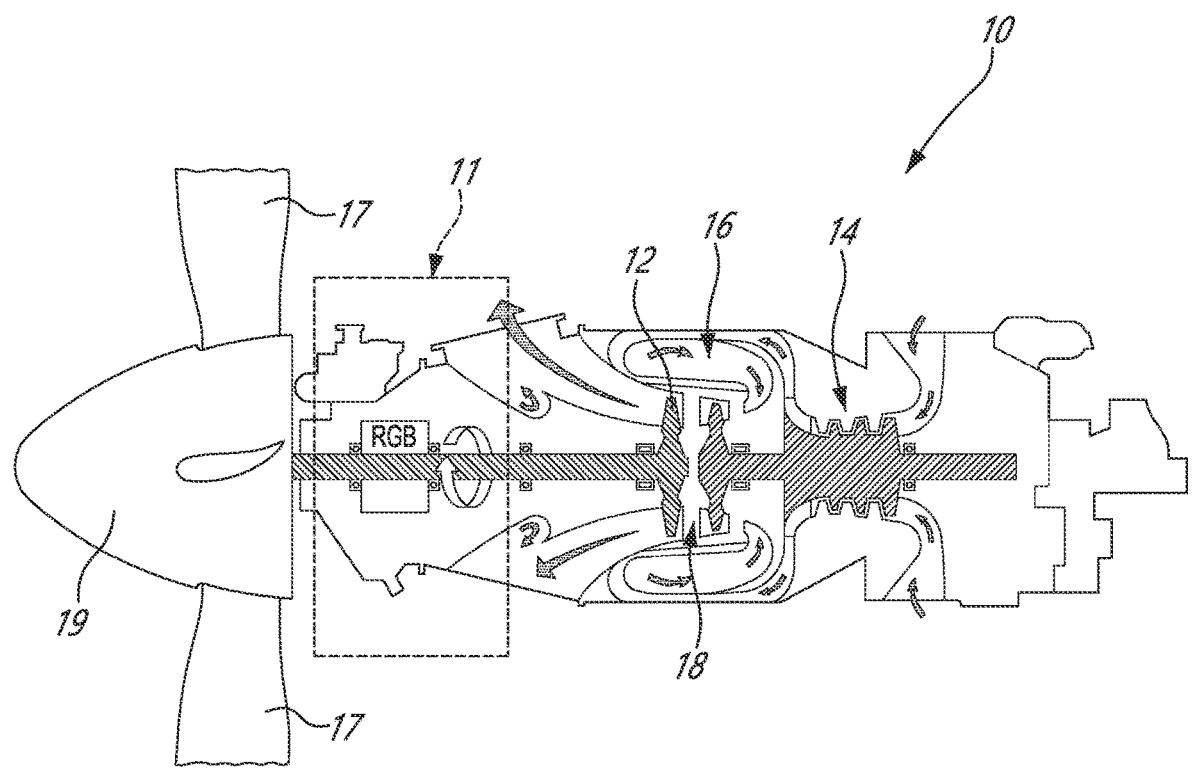
FIG. 1 is a schematic cross sectional view of a gas turbine engine of a turboprop type.

FIG. 1 illustrates a gas turbine engine 10 of a type preferably provided for use in subsonic flight, generally comprising in serial flow communication a compressor section 14 for pressurizing ambient air, a combustor 16 in which the compressed air is mixed with fuel and ignited for generating an annular stream of hot combustion gases, and a turbine section 18 for extracting energy from the combustion gases. A low pressure (LP) turbine 12 drives, via a reduction gear box RGB, a propeller 19 having propeller blades 17 for providing thrust to an aircraft. An oil system 11 is provided for the gas turbine engine 10, and provides lubrication for the rotating components of the gas turbine engine 10, which include bearings for the rotating turbomachinery (e.g. the compressors, turbines, shafts, and gears), the RGB and the propeller control systems, etc.

Figure 2:
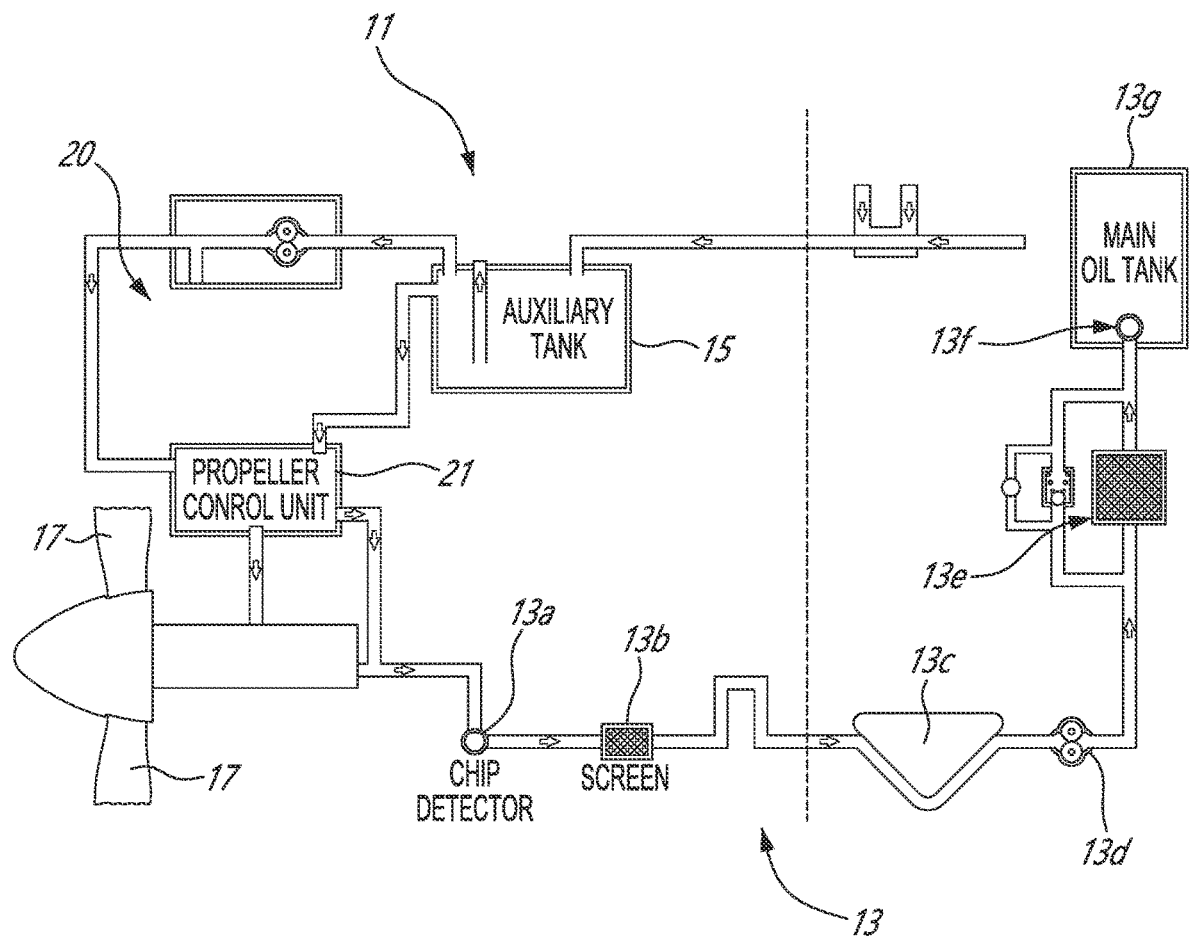
FIG. 2 is a schematic view of an oil system for the gas turbine engine of FIG. 1, the oil system having a propeller blade angle control circuit.

Referring to FIG. 2, the oil system 11 can include any number of components, and any arrangement of components, to provide lubrication to the gas turbine engine 10. One such component, an engine oil distribution system 13, is shown in the depicted embodiment. The engine oil distribution system 13 receives used or scavenged oil from the lubricated components of the gas turbine engine 10, and may filter and/or cool the reclaimed oil. The engine oil distribution system 13 may pressurize the reclaimed oil for recirculation to the rotating turbomachinery. In the depicted embodiment, the engine oil distribution system 13 may include a chip detector 13a to detect the presence of unacceptably-large debris in the oil returning from the propeller 19. The oil and any debris may then be filtered with a screen 13b, and may then be subjected to anti-icing procedures at an anti-icing station 13c. A scavenge pump 13d pressurizes the oil and sends it through another filter 13e before passing through another chip detector 13f before being collected in a main oil tank 13g. From the main oil tank 13g, the oil can be pumped with a supply pump to any number of different components of the oil system 11. For example, oil can be pumped from the supply pump to an auxiliary oil tank 15. The engine oil distribution system 13 can have more, fewer, and/or different components than those schematically depicted or described above.

In the depicted embodiment, the auxiliary oil tank 15 serves as a source of oil for a propeller blade angle control circuit 20. The oil supplied to the propeller blade angle control circuit 20 (or "control circuit 20") provides hydraulic power to the propeller control circuit 20, allowing it to control the pitch of the variable-pitch propeller blades 17. The control circuit 20 may be integrated with, and supplied by, the oil system 11. By being integrated with the oil system 11 of the gas turbine engine, the control circuit 20 is able to use the oil provided by oil system 11 to control the pitch of the propeller blades 17. The oil system 11 therefore provides a lubricating function, and an actuating function by providing hydraulic power.

Figure 3:
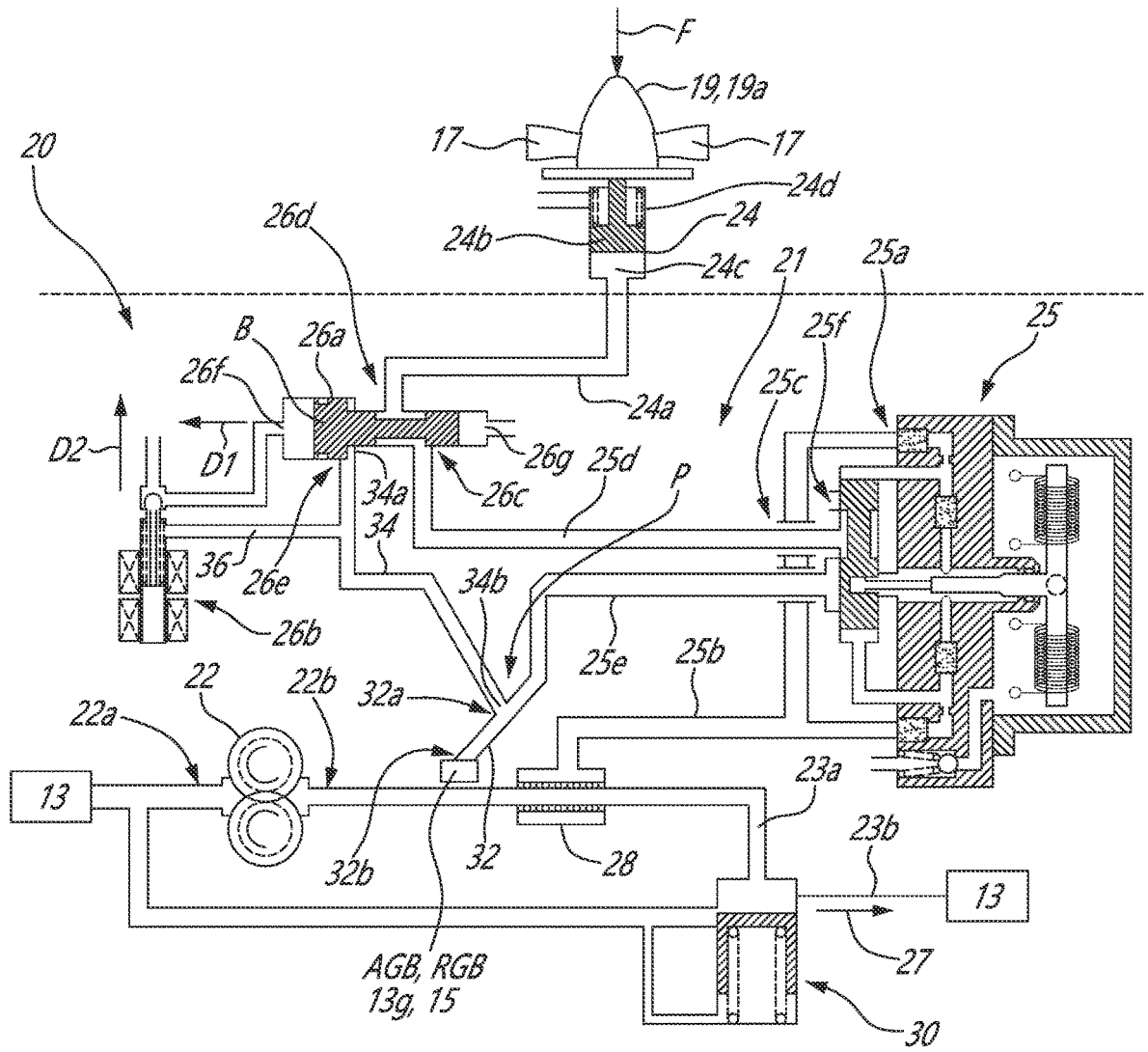
FIG. 3 is a schematic view of the propeller blade angle control circuit of FIG. 2.

The control circuit 20 is an assembly of fluid lines, connectors, valves, and other components that supply oil to the mechanisms that change the pitch of the propeller blades 17. In the embodiment of FIG. 3, the control circuit 20 has a propeller control unit 21 to effect changes in the pitch of the propeller blades 17, a pump such as a fixed-displacement pump 22 or the like which provides pressurized oil to the propeller control unit 21, an oil pressure supply line 23a that provides oil to different components as discussed below, a pressure relief line 23b that direct excess oil back to the oil pump 22, and a flow controller, also referred to as a pressure relief valve, 30 which modulates the flow of oil to maintain a substantially constant pressure into the oil pressure supply line 23a. Herein, the expression "line" as in "oil line" and "hydraulic fluid line" encompasses a hose, a conduit, a passage, a channel, and any other structure able to flow a fluid and to hydraulically connect two elements to one another. Although the pump 22 is shown as a fixed-displacement pump, any suitable type of pump may be used without departing from the scope of the present disclosure.

The propeller control unit 21 modulates the supply of oil that is used to modify the angle of the propeller blades 17. It can thus have any suitable component, and any suitable arrangement of components, to achieve this functionality. More particularly, the propeller control unit 21 may include different actuators, valves, and other components to adjust the angle of the propeller blades 17. In the depicted embodiment, the propeller control unit 21 has a propeller pitch change actuator 24 which can effect fine and coarse changes in propeller blade 17 pitch. The pitch change actuator 24 may be located within a dome 19a of the propeller 19. The propeller control unit 21 also has a servo valve 25 or the like which controls the pressure of the oil supplied to the pitch change actuator 24. The propeller control unit 21 also has a protective system that may include different actuators, valves or other components to adjust the angle of the blades in conditions of detected issues with the PCU control circuit 20. A protective system illustratively considered as a feather valve 26a supplied with oil by the servo valve 25, and activated by a feather solenoid 26b. The expression "feather" used as a moniker may refer to a feathering action that may be caused with the propeller blades 17. Any appropriate type of valve may be used therefor. The propeller control unit 21 can have more, fewer, and/or different components than those depicted or described above. Operation of these components is described further below.

The fixed-displacement pump 22 outputs a substantially constant flow rate of oil to the propeller control unit (PCU) 21. The pump 22 is therefore located within the control circuit 20 upstream of the propeller control unit 21, and acts as a dedicated source of constant hydraulic power. It is typically sized to provide sufficient hydraulic power to satisfy the largest loads of the propeller control unit 21. The pump 22 is supplied with oil from a component of the oil system 11, such as from the engine oil distribution system 13.

Still referring to FIG. 3, the oil pressure relief line 23b is a return line which sends excess oil from the pressure relief valve 30 to an inlet 22a of the PCU oil pump 22. Alternatively, the return line may flow the excess oil to any other reservoir such as a reduction gearbox housing or to the engine oil distribution system 13. The oil pressure relief line 23b can therefore be any hose, tube, pipe, or other similar conduit that extends from an outlet 22b of the pump 22 to inlet to the PCU oil pump.

In allowing excess oil to be diverted away from the pump 22 and propeller control unit 21, the oil pressure relief line 23b defines a path 27 via which excess oil flows back to the engine oil distribution system 13. "Excess" oil is oil that is supplied by the fixed-displacement pump 22 but that exceeds the specified constant oil pressure in the oil pressure supply line 23a. The pressure relief valve 30 therefore modulates the opening of an outlet port for excess oil to bypass to the inlet 22a to PCU oil pump 22.

Still referring to FIG. 3, in normal operating conditions, an inlet port 25f of the servo-valve 25 is hydraulically connected to receive oil from an oil source, which may correspond to the oil distribution system 13, or any other oil systems of the engine 10. In the embodiment shown, the inlet port 25f is directly connected to the oil supply pressure line 23a downstream of the wash screen 28. The inlet port 25f may alternatively be connected to the oil supply pressure line 23a upstream of the wash screen 28. In an alternate embodiment, the oil may come from an oil system of the reduction gearbox RGB or be delivered from any external source of continuous oil pressure supply (e.g. may come from a dedicated oil pump providing pressurized pressure to the PCU—external or internal to PCU, be extracted from engine main oil pump or be derived from any continuous oil flow line within the engine system). The oil circulates from the oil distribution system 13 to an inlet 25a of the servo-valve 25 via a servo-valve inlet line 25b. The servo-valve 25 controls the pressure of the oil that is distributed to the pitch angle actuator 24. The servo-valve 25 outputs the oil via an outlet 25c and directs the oil via a feeding line 25d to a first port 26c of the feather valve 26a. The oil then exits the feather valve 26a via a second port 26d to flow toward the pitch angle actuator 24 via an actuator line 24a. When the oil comes from another oil source at a different pressure than that of the servo valve 25, the feather valve 26a may be designed such that surfaces on which fluid pressure is acting are sized accordingly to avoid inadvertent transition of the feather valve in any direction induced by the flow from the servo valve 25 to ensure proper counteracting of pressure on the body B of the feather valve 26a.

The pitch angle actuator 24 may include a piston 24b that moves within an actuator cavity 24c of the pitch angle actuator 24. On the opposite side of the piston 24b, a biasing member 24d, such as a spring, may be used to counteract the force of the oil received in the pitch angle actuator 24. In the depicted embodiment, the biasing member 24d is configured to push the blades 17 of the propeller 19 in a feather position when no oil is received within the actuator cavity 24c. In other words, upon a malfunction of, for instance, the oil system or the engine 10, oil may have to be expelled from the pitch angle actuator 24 to allow the spring to push the piston 24b in a baseline position in which the blades 17 are in the feather position. If there is a malfunction in the engine and/or in the servo-valve 25, it may be required to bring the blades in the feathering position for safety purposes. Therefore, oil that is contained in the actuator cavity 24c may have to be expelled out of said cavity 24c to be able to bring the blades 17 in the feathering position.

The feather position of the blades 17 corresponds to a position in which an angle of attack defined between the blades 17 and an incoming flow F is such that there is no lifting force created by the incoming flow F on the blades 17. In other words, when the blades 17 are in a feathering position, the blades 17 offer a reduced or minimum drag to the incoming flow F and are in a position that may not result in the incoming flow F from inducing rotation of the propeller. The feathering position is typically used where there is an engine shutdown when the aircraft is flying. Having the blades 17 in the feathering position may prevent the incoming flow F from creating a wind-milling effect of the propeller 19 which might damage the engine 10 when the engine is not operational.

In normal operating conditions, it may be required to change the quantity of oil that is contained within the cavity 24c to be able to dynamically change the angle of attack of the blades 17 relative to the incoming flow F. To do so, the servo-valve 25 varies a flow rate of oil that is supplied to the actuator cavity 24c. Excess oil not required by the servo-valve 25 may be expelled back to the oil distribution system 13 via an output line 25e. The oil that is expelled out of the servo-valve 25 via the output line 25e is circulated into a drain line 32. The drain line 32 has an inlet 32a fluidly connected to an outlet of the output line 25e of the servo-valve 25 and has an outlet 32b that may be fluidly connected to any suitable location, such as a RGB, an AGB, an oil tank 13g, 15, and so on.

The drain line 32 provides a passage for oil pressure drainage for propeller angle increase. This may be required for propeller deceleration or performing propeller feather in normal propeller operation (e.g. accompanying the engine shut down), or as a reaction of the control system to the detected propeller over speed conditions or to the detected unexpected propeller transition below blade angle threshold.

In adverse operating conditions, when propeller pitch controller is unable to control propeller speed and or angle resulting in the propeller entering undesired operating mode, a protective system such as the feather valve 26a moves from a first position depicted in FIG. 3 to a second position. More specifically, a valve body B of the feather valve 26a moves within a cavity of the feather valve 26a from the first position in which the servo-valve 25 is fluidly connected to the pitch angle actuator 24 through the feather valve 26a to the second position along direction D1. In the second position, fluid flow communication between the pitch angle actuator 24 and the servo-valve 25 is blocked by the feather valve 26a. Moreover, in the first position, fluid communication between the pitch angle actuator 24 and a third port 26e of the feather valve 26a is blocked. In the second position of the feather valve 26a, fluid communication between the actuator 24 and the third port 26e of the feather valve 26a is permitted. In the second, or feather, configuration of the feather valve 26a, the oil that is contained in the cavity 26c of the actuator 24 is able to exit said cavity 26c through the feather valve 26a and via an output line 34. The output line 34 has an inlet 34a fluidly connected to the third port 26e of the feather valve 26a and an outlet 34b that is fluidly connected to the inlet 32a of the drain line 32.

Still referring to FIG. 3, the feather valve 26a has a fourth port 26f and a fifth port 26g. These ports 26f, 26g communicates with the cavity of the feather valve 26a and may be referred to as actuation ports since they are used to control the position of the body B of the feather valve 26a. The body B is between the fourth and fifth ports 26f, 26g. The fourth and fifth ports 26f, 26g are typically hydraulically connected to the oil pressure supply line 23 via the wash screen 28 in order to maintain the feather valve 26a, and its body B, at fixed position. The fourth and fifth ports 26f, 26g are supplied by the oil pressure derived from the same source as the balance of static oil pressures is required on both sides of the body B of the feather valve 26a. This maintains the body B of the feather valve 26 in equilibrium in the normal position shown in FIG. 3. When it is desired to activate the protective propeller feather of the blades 17 of the propeller 19, and to move the body B of the feather valve 26 in its feather position, the feather solenoid 26b is energized to change this equilibrium of pressure thereby inducing movement of the body B in the direction D1 to fluidly connect the pitch angle actuator 24 and its cavity 24c with the drain line 34 through the feather valve 26a to allow the feathering of the blades 17.

However, as the operability of the feather valve 26a and the operability of the servo valve 25 may depend on static oil pressure that provides counteracting reaction, a design in which the static pressure for positioning both the servo valve 25 and the feather valve 26 is derived from a common source may be susceptible to affect performance of both systems if a problem with this common oil source were to occur. Such a problem, may be, for instance, break of a line or blockage in the wash screen 28. It may therefore be desired to decouple these two systems.

Referring now to FIG. 4, a propeller blade angle control circuit in accordance with another embodiment is shown at 120. Features of the propeller blade angle control circuit 120 may at least partially alleviate the aforementioned drawbacks. For the sake of conciseness, only elements that differ from the circuit 20 of FIG. 3 are described below.

As a design principle, in order to ensure the independence between the feather valve 26a and the servo valve 25, it is proposed that each device utilizes a respective source of static oil pressure being independent for each of the devices. The design principle proposed herein assumes independent oil line providing static pressure to the feather valve 26a and separate, independent oil line providing the static oil pressure to the servo valve 25.

In the embodiment shown, if a loss of oil pressure were to occur, which may impede proper operation of the feather valve 26a and the servo valve 25, oil pressure is no longer supplied to the servo valve 25 and results in a propeller feather even if direct actuation of the feather valve 26a is impeded. As discussed below, the servo valve 25 and the feather valve 26a may utilize separated and independent supplies of the static pressure that may ensure the functionality of at least one of the two systems in case of a potential problem with any of the oil supply lines or with the oil supply system 13. This may include, for instance, a flow of oil through the wash screen 28 being limited, problem with the pump 22, excessive oil pressure delivered to one of the systems or to both, reduction of the static pressure to one of the systems or to both.

As will be described below, each of the feather valve 26a and the servo valve 25 are hydraulically connected to a respective oil source. The expression "source" as used herein refers to a location from which oil is drawn. The two different oil sources may be independent, but may be connected to a common element. For instance, the common element may be an oil line and the two oil sources may be two distinct connection points on this oil line; the two distinct connection points being spaced apart and separated from one another. The source may be common (e.g., an oil tank), but each of the feather valve 26a and the servo valve 25 may draw oil from this oil tank via two different and distinct ports. In other words, in the exemplary embodiment described below with reference to FIG. 4, the feather valve 26a and the servo valve 25 do not draw their oil from a common connection point to avoid the risk of this common connection point becoming clogged and affecting operation of both the feather valve 26a and the servo valve 25.

In the embodiment shown, the fourth and fifth ports 26f, 26g of the feather valve 26 are hydraulically connected to a main line 140 that hydraulically connects the oil distribution system 13 to the PCU oil pump 22. This oil distribution system 13 may be alternatively an oil system of an engine accessory such as an engine main oil pump. In the embodiment shown, this main line 140 hydraulically connects the oil distribution system 13 of the engine 10 to the pump 22. It will be appreciated that the main line 140 may hydraulically connect another oil system, such as an oil system of the RGB or of an accessory gearbox AGB, to the pump 22.

A feeding line 141 stems from the main line 140 and hydraulically connects the main line 140 to both of the fourth and fifth ports 26f, 26g of the feather valve 26a. Two sub-lines 142, 143 stem from the feeding line 141. Each of the two sub-lines 142, 143 hydraulically connects the feeding line 141 to a respective one of the fourth and fifth ports 26f, 26g. The main line 140 is hydraulically connected to the pump 22 to supply the servo valve 25 via the oil supply line 23a. However, since connection points of the feeding line 141 and the servo valve inlet line 25b are distinct and spaced apart from one another, risks of both of the feeding line 141 and the servo valve inlet line 25b becoming clogged simultaneously may be minimized. In other words, in the present embodiment, there may be no single issues with the oil distribution system 13 that can affect the functionality of both the feather valve 26a and the servo valve 25, and, thus, both the protection and control of the propeller 17.

In the embodiment shown, a loss of oil flow flowing into the main line 140 may affect both the feather valve 26a and the servo valve 25. However, no oil to the PCU oil pump 22 induces propeller feather, therefore the functionality of the feather valve 26a is considered indirectly "triggered". Similarly, in the embodiment shown, it may be unlikely to clog both the feather valve 26a and the servo valve 25 due to contamination build up, as the oil flow of the main line 140 may be filtered at the outflow from engine system e.g. at the outflow from engine oil pump. Therefore, the feather valve 26a may receive filtered oil unaffected by the contaminants released by the PCU oil pump 22, while the static oil pressure line derived to the servo valve 25 from the main oil pressure supply line 23a downstream of the PCU oil pump 22 may be susceptible to the contaminants flowing in PCU system.

If the feather valve 26a is required to be fully independent from the servo valve 25, the static oil pressure supplied to the feather valve 26a can be derived from a fully independent source of oil pressure supply, such as from fully independent oil supply line from the engine main oil pressure pump, or from any other suitable installation of the oil pressure extracting from the engine system for the purpose of delivery of the pressure to the protective device. In a particular embodiment, a feeding line 141' may be hydraulically connected to the reduction gearbox RBG, to an accessory gear box AGB, to an engine oil pump EP, to the main oil tank 13g, or to the auxiliary oil tank 15. This alternate feeding line 141' is shown with dashed lines in FIG. 4. A different oil system (e.g., accessory gear box oil system, engine oil system) may be used to feed oil to the feather valve 26a.

The feeding line 141 or 141' is therefore used to supply oil at a same pressure to the fourth and fifth ports 26f, 26g of the feather valve 26a to maintain the body B of the feather valve 26a in its normal position depicted in FIG. 4. Again, and as explained above, should feathering of the blades 17 of the propeller 19 become necessary, the valve solenoid 26b may be energized to hydraulically connect the fourth port 26f of the feather valve 26a to the drain line 32 to enable the movement of the body B in direction D1 toward the feather position.

Therefore, the servo valve 25 and the feather valve 26a are supplied with oil via two different independent lines, namely the feeding line 141 for the feather valve 26a and the main oil supply line 23a for the servo valve 25. These two lines may be defined by distinct and independent passages within a housing of the propeller control unit. Herein, "independent" implies that a blockage in one of the servo valve inlet line 25b and the feeding line 141 does not also create a risk of blockage in the other of the servo valve inlet line 25b/supply line 23b and the feeding line 141. This may be possible by having inlets of the servo valve inlet line 25b and the feeding line 141 at respective different positions or connection points on the main oil pressure supply line 23a, by having the inlets the servo valve inlet line 25b and the feeding line 141 respectively downstream and upstream of the pump 22, or by having the feeding line 141 hydraulically connected to a different oil system, for instance, to the oil system of the RBG. In some embodiments, the expression "independent" implies that there is no intersection between the servo valve inlet line 25b and the feeding line 141. That is, these two lines do not share a common inlet. These two lines may not share a common oil pressure supply system to avoid issues in such common oil pressure supply system to result in issues with both of the feather valve 26a and the servo valve 25. In an alternate embodiment, an external oil pump may be used strictly to produce static oil pressure delivered to both the feather valve 26a and the servo valve 25 or strictly to one of these two valves 26a or 25.

In operation, if feathering of the blades 17 becomes required, the feather solenoid 26b is energized to block fluid communication between the fourth port 26f of the feather valve 26a and the feeding line 141 and allows fluid communication between the fourth port 26f and the drain line 32 to move the body B of the feather valve 26a in direction D1 to hydraulically connect the propeller dome 19 to the drain line 32.

Referring back to FIG. 3, during prolonged use of the propeller control unit, metallic particles or any other debris may impede flow through the drain line 32. Typically, a flow restriction may form proximate the inlet 32a of the drain line 32 where a connection point P is located between the output line 34 of the feather valve 26a, the output line 25e of the servo-valve 25 and the drain line 32.

More specifically, in the embodiment of FIG. 3, the PCU 21 utilizes one drain line for oil relief for protecting functions and uses the same drain line for propeller angle increase in normal operating conditions. This single line design may be affected with extended utilization by multiple factors, such as contamination build up, by oil flows continuously utilizing the passage. Restriction of oil flow through the passage would change the rate of oil drain that may alter the propeller protecting and governing functions.

Referring now to FIG. 5, another embodiment of the propeller blade angle control circuit is shown at 220. In the embodiment shown, the feather valve 26a has a dedicated feather valve drain line 234 and the servo valve 25 has a dedicated servo valve drain line 225e. Contrary to the configuration described above with reference to FIG. 3, the feather valve drain line 234 and the servo valve drain line 225e are independent from one another. That is, each of those drain lines 234, 225e has a dedicated outlet. In other words, those two drain lines do not converge to a common connection point P as described above with reference to FIG. 3. Therefore, these two separate drain lines may not pose a risk of any flow restriction affecting both systems at the same time. This may ensure free flow of the drain line throughout the life of the assembly.

In the embodiment shown, each of the feather valve drain line 234 and the servo valve drain line 225e is hydraulically connected to a respective one of first and second oil drain outlets 234a, 225f. The drain outlet 234a of the feather valve drain line 234 may be, for instance, hydraulically connected to the reduction gear box, the main oil tank 13g (FIG. 2), the auxiliary oil tank 15 (FIG. 2), the accessory gearbox AGB or to any suitable location in the engine system. Similarly, the drain outlet 225f of the servo valve drain line 225e, which is herein fully separated from the feather valve drain line 234, may be, for instance, hydraulically connected to the reduction gear box, the main oil tank 13g (FIG. 2), the auxiliary oil tank 15 (FIG. 2), the accessory gearbox AGB or to any suitable location in the engine system. The drain outlets 234a, 225f of the feather valve drain line 234 and of the servo valve drain line 225e may be connected to different components (e.g., one line drains to the reduction gearbox RGB and the other to the main line 140). In some cases, they may be connected to the same components (e.g., collector/reservoir), but at distinct connection ports (e.g., two distinct and separated ports on the auxiliary tank 15). Any suitable drain location may be used without departing from the scope of the present disclosure. For instance, the drain locations may be, a cavity of another gearbox, another oil system of the engine 10, a dedicated scavenge receptacle coupled with a scavenge pump operable to draw the drained oil out from the scavenge receptacle and to flow the scavenged drained oil back to the circuit 220 for further use by the feather valve 26*a* and/or by the servo valve 25.

In an alternate embodiment, a scavenge line or scavenge pump may be connected to one of the feather valve 26*a* and the servo valve 25. This may ensure that one system always remains operable for drainage. Similar result may be obtained from both lines draining to one passage of significantly greater diameter than both passages, since there may be no possibility of contaminants flowing through both passages simultaneously clogging the common passage of significantly higher diameter.

It will be appreciated that the circuit 220 of FIG. 5 may include the feeding and sub lines 141, 142, 143 described herein above to hydraulically connect the fourth and fifth ports 26*f*, 26*g* of the feather valve 26*a* to the main line 140. That is, features of the circuit 120 described above with reference to FIG. 4 may be combined with features of the circuit 220 described above with reference to FIG. 5.

It will be understood that, although the present circuit has been described using oil as the liquid that flows through the different components to control the pitch angles of the blades 17 of the propeller 19, any suitable incompressible fluid and liquid may be used. Any suitable hydraulic fluid may be used.

It will be understood, that, although the presented solution is related to the propeller control system, any other assembly that combines the protective features and control features can follow the defined design principles of this disclosure. For example, fuel control unit that incorporates fuel control system that controls the fuel supply to the engine and that incorporates the engine protection system that relies on fuel flow reduction induced by an independent system to the control actuator, being integrated in the same accessory of the fuel control system. Another example where the design principles presented herein, is understood to be any hydraulic or pneumatic system that provides actuation of the aircraft steering (e.g. horizontal, vertical) where the back-up actuation system must remain independent and fully operable and back-up system and main actuating system, both utilizing the fluid flow supply/drain for performing actuation of the aircraft steering elements.

Similarly, all the systems utilizing cooling fluid flow necessary to cool the operating system, if comprised of primary system and back-up system in one accessory where both modulate the supply and drain flow of cooling fluid for achieving the required target temperature are considered potential candidates where the design principles of the scope of this disclosure.

It is also understood that the design principles apply to all the types of the aircraft propulsion where the exchange of the fluid pressure is governed by two mechanisms integrated together, namely one primary system controls the fluid flow supply and fluid flow reduction wherein the second system provides a back-up control over the fluid pressure by providing back-up means of the fluid flow supply or reduction in a scenario of a problem with the primary system. Among such systems may be a system delivering the hydrogen to the hybrid engine.

The present disclosure proposes an independent oil supply for respective actuation to the feather valve 26*a* and of the servo valve 25. That is, the supply for static oil pressure delivered to both valves 26*a*, 25 is coming from two independent sources, which may not be restricted at the same time from a common problem. One possible way to achieve independence is using the oil supply as a static pressure to control the servo valve 25 from a filtered line of the downstream flow from PCU oil pump 22. The oil delivery of the static pressure for the feather valve 26*a* would be delivered from an external oil supply line (e.g. supplied from the unfiltered line of the upstream flow to the PCU oil pump, or directly from the RGB. In addition, or in alternation, a drain of the oil pressure from the feather valve 26*a* and from the servo valve 25 may use independent paths for each. If a common line is used, it is designed to limit the line from clogging and restricting completely the oil drain from both systems.

The proposed arrangement of separated oil flows may protect from contaminants released by the pump 22 from clogging the static oil pressure delivery line to both of the feather valve 26*a* and the servo valve 25 at the common filtering element (e.g. of the Wash Screen 28). This disclosed solution may eliminate the risk from a common oil line derived from a main downstream flow from the oil pump being used for both systems, which in case of leakage or loss of oil from that path could affect or disable both the feather valve 26*a* and the servo valve 25.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A propeller control unit (PCU) for controlling pitch angles of blades of a propeller, comprising:
   a pitch angle actuator operatively connected to the blades of the propeller;
   a servo valve hydraulically connected to the pitch angle actuator and to a first hydraulic fluid source, the servo valve operable to flow hydraulic fluid to and from the pitch angle actuator to control the pitch angles of the blades; and
   a feather valve having a body movable within a cavity, the feather valve having a first actuation port and a second actuation port both in fluid communication with the cavity, the body between the first actuation port and the second actuation port, the body being movable to selectively hydraulically connect the pitch angle actuator to the servo valve through the feather valve for controlling the pitch angles or to hydraulically connect the pitch angle actuator to a drain line through the feather valve for feathering the blades,
   the first actuation port and the second actuation port hydraulically connected to a second hydraulic fluid source independent from the first hydraulic fluid source for providing hydraulic pressure on the body of the feather valve while the first hydraulic fluid source provides hydraulic pressure to the servo valve.

2. The PCU of claim 1, wherein the first hydraulic fluid source and the second hydraulic fluid source correspond to first and second connections point on a main line, the first and second connection points being spaced apart from one another.

3. The PCU of claim 2, wherein a pump is hydraulically connected on the main line for flowing the hydraulic fluid toward the servo valve, the first connection point located upstream of the pump, the second connection point located downstream of the pump.

4. The PCU of claim 1, wherein the first hydraulic fluid source and the second hydraulic fluid source are two different components.

5. The PCU of claim 4, wherein the first hydraulic fluid source is one of a reduction gearbox, an hydraulic fluid tank, an accessory gearbox, and an engine oil system, and wherein the second hydraulic fluid source is another one of the reduction gearbox, the hydraulic fluid tank, the accessory gearbox, and the engine oil system.

6. The PCU of claim 1, wherein the servo valve is hydraulically connected to the first hydraulic fluid source through a filtering element.

7. The PCU of claim 1, wherein the first hydraulic source and the second hydraulic source are two different connection ports on a common component.

8. The PCU of claim 7, wherein the common component is one of a reduction gearbox, an hydraulic fluid tank, an accessory gearbox, and an engine oil system, and wherein the second hydraulic fluid source is another one of the reduction gearbox, the hydraulic fluid tank, the accessory gearbox, and the engine oil system.

9. A propeller control unit (PCU) for controlling pitch angles of blades of a propeller, comprising:
a pitch angle actuator operatively connected to the blades of the propeller;
a servo valve hydraulically connected to the pitch angle actuator, the servo valve hydraulically connected to an hydraulic fluid source via a first line, the servo valve operable to flow hydraulic fluid to and from the pitch angle actuator to control the pitch angles of the blades; and
a feather valve having a body movable within a cavity, the feather valve having a first actuation port and a second actuation port both in fluid communication with the cavity, the body between the first actuation port and the second actuation port, the body being movable to selectively hydraulically connect the pitch angle actuator to the servo valve through the feather valve for controlling the pitch angles or to hydraulically connect the pitch angle actuator to a drain line through the feather valve for feathering the blades,
the first actuation port and the second actuation port hydraulically connected to the hydraulic fluid source via a second line independent from the first line, the second line allowing flow of hydraulic fluid therein while hydraulic fluid flows in the first line.

10. The PCU of claim 9, wherein the first line is hydraulically connected to a main line at a first connection point, the second line hydraulically connected to the main line at a second connection point spaced apart from the first connection point, the main line hydraulically connected to the hydraulic fluid source.

11. The PCU of claim 10, wherein a pump is hydraulically connected on the main line, the first connection point located upstream of the pump, the second connection point located downstream of the pump.

12. The PCU of claim 9, wherein each of the first and second lines is hydraulically connected to a respective one of two distinct ports defined by one of a reduction gearbox, an hydraulic fluid tank, an accessory gearbox, and an engine oil system.

13. The PCU of claim 9, wherein the servo valve is hydraulically connected to the hydraulic fluid source via the first line and via a filtering element.

14. A propeller control unit (PCU) for controlling pitch angles of blades of a propeller, comprising:
a pitch angle actuator operatively connected to the blades of the propeller;
a servo valve hydraulically connected to the pitch angle actuator, the servo valve hydraulically connected to a hydraulic fluid source, the servo valve operable to flow hydraulic fluid to and from the pitch angle actuator to control the pitch angles of the blades, the servo valve having an outlet;
a feather valve operable to selectively hydraulically connect the pitch angle actuator to the servo valve through the feather valve for controlling the pitch angles or to hydraulically connect the pitch angle actuator to a drain outlet of the feather valve for feathering the blades; and
a first drain line hydraulically connected to the outlet of the servo valve, the first drain line having a first drain outlet;
a second drain line hydraulically connected to the drain outlet of the feather valve, the second drain line having a second drain outlet, the first drain outlet and the second drain outlet being independent from one another, and the second drain line allowing flow of hydraulic fluid therein while hydraulic fluid flows in the first drain line.

15. The PCU of claim 14, wherein the first drain outlet is hydraulically connected to one of a reduction gearbox, an hydraulic fluid tank, an accessory gearbox, and an engine oil system, the second drain outlet hydraulically connected to another one of the reduction gearbox, the hydraulic fluid tank, the accessory gearbox, and the engine oil system.

16. The PCU of claim 14, wherein each of the first drain outlet and second drain outlet is hydraulically connected to a respective one of two distinct ports defined by one of a reduction gearbox, an hydraulic fluid tank, an accessory gearbox, and an engine oil system.

17. The PCU of claim 14, wherein the feather valve has a first actuation port, a second actuation port, and a body between the first actuation port and the second actuation port, the body being movable within a cavity of the feather valve to selectively hydraulically connect the pitch angle actuator to the servo valve through the feather valve or to the second drain line through the feather valve, the first actuation port and the second actuation port hydraulically connected to the hydraulic fluid source via a first line, the first line independent from a second line hydraulically connecting the servo valve to the hydraulic fluid source.

18. The PCU of claim 17, wherein the first line is hydraulically connected to a main line at a first connection point, the second line hydraulically connected to the main line at a second connection point spaced apart from the first connection point.

19. The PCU of claim 18, wherein a pump is hydraulically connected on the main line for flowing hydraulic fluid toward the servo valve, the first connection point located upstream of the pump, the second connection point located downstream of the pump.

20. The PCU of claim 17, wherein each of the first and second lines is hydraulically connected to a respective one of two distinct ports defined by one of a reduction gearbox, an hydraulic fluid tank, an accessory gearbox, and an engine oil system.

* * * * *